United States Patent [19]
Blann et al.

[11] Patent Number: 5,967,176
[45] Date of Patent: Oct. 19, 1999

[54] AUTOMATIC FLOW CONTROL VALVE WITH VARIABLE SET-POINTS

[76] Inventors: Brian David Francis Blann, 2430 Palmerstoon Avenue, West Vancouver, Canada, V7V 2L2; Kari Juhani Oksanen, 705 West 64th Avenue, Vancouver, Canada, V6P 2L2

[21] Appl. No.: 09/062,429

[22] Filed: Apr. 17, 1998

[51] Int. Cl.⁶ .................. F16K 31/12; F16K 31/365
[52] U.S. Cl. .................. 137/489.5; 137/488; 137/489
[58] Field of Search .................. 137/489.5, 488, 137/489

[56] References Cited

U.S. PATENT DOCUMENTS

| | | |
|---|---|---|
| 843,174 | 2/1907 | Reynolds . |
| 1,157,957 | 10/1915 | Pfau .................................. 137/489 |
| 1,228,104 | 5/1917 | Fulton . |
| 2,059,121 | 10/1936 | Lake . |
| 2,309,848 | 2/1943 | King .................................. 137/489 |
| 2,646,064 | 7/1953 | Colton . |
| 3,542,052 | 11/1970 | Irwin .................................. 137/116.5 |
| 3,930,518 | 1/1976 | Fuller et al. ....................... 137/486 |
| 4,000,754 | 1/1977 | Risk .................................. 137/487 |
| 4,312,375 | 1/1982 | Leinemann ......................... 137/489 |
| 4,535,805 | 8/1985 | Mertz ................................. 137/489 |
| 4,791,954 | 12/1988 | Hasegawa .......................... 137/489.5 |
| 4,944,249 | 7/1990 | Takeuchi et al. .................. 137/489 |
| 5,348,036 | 9/1994 | Oksanen et al. .................... 137/1 |
| 5,460,196 | 10/1995 | Yonnet .............................. 137/489.5 |

OTHER PUBLICATIONS

Bermad Model 720–07 VRP–CC Pressure Reducing and Flow Compensating Valve; 1 sheet drawings, 1 sheet of Spanish Text and 2 sheets of English translation, published by Bermad Corporation of Evron, Isreal Nov. 1994.

Variable Pressure Reducing INBAL Valve, Series 500–VR; 600–VR; 700–VR, 10 pages published by MIL Ltd., Holon, Israel and Magisco Valves Ltd. Wolverhampton, England prior to Apr. 17, 1997.

Good Practice—Case Study 25, 4 pages. Published by Energy Efficiency Office, Dept. of Energy, England, Oct. 1990.

*Primary Examiner*—Denise L. Ferensic
*Assistant Examiner*—Joanne Y. Kim
*Attorney, Agent, or Firm*—Knobbe, Martens, Olson & Bear, LLP

[57] ABSTRACT

The invention provides a pilot valve apparatus for use in an automatic fluid control system for maintaining pressure downstream from a main control valve between two set-points irrespective of flow changes through the main control valve. The pilot valve has a flexible pilot diaphragm which moves with a moveable pilot valve member to cooperate with a fixed pilot valve member to control fluid flow through the pilot valve apparatus. The pilot valve controls control pressure acting on the main control valve. An actuator apparatus connected to a body of the pilot valve apparatus has a moveable actuator partition which is exposed to a pressure differential signal reflecting flow through the main control valve. A resilient connector cooperates with the actuator partition and the pilot diaphragm to permit limited relative movement therebetween, and to transfer resilient force to the pilot diaphragm resulting from movement of the actuator partition. This transfer varies location of the moveable pilot valve member with respect to the fixed pilot valve member to vary flow through the pilot valve apparatus, so as to vary control pressure, which in turn controls the main control valve. An adjustable actuator stop can cooperate with the actuator partition to limit movement of the actuator partition. An actuator resilient member can cooperate with the actuator partition to apply a force selectively to the actuator partition to resist displacement thereof.

37 Claims, 5 Drawing Sheets

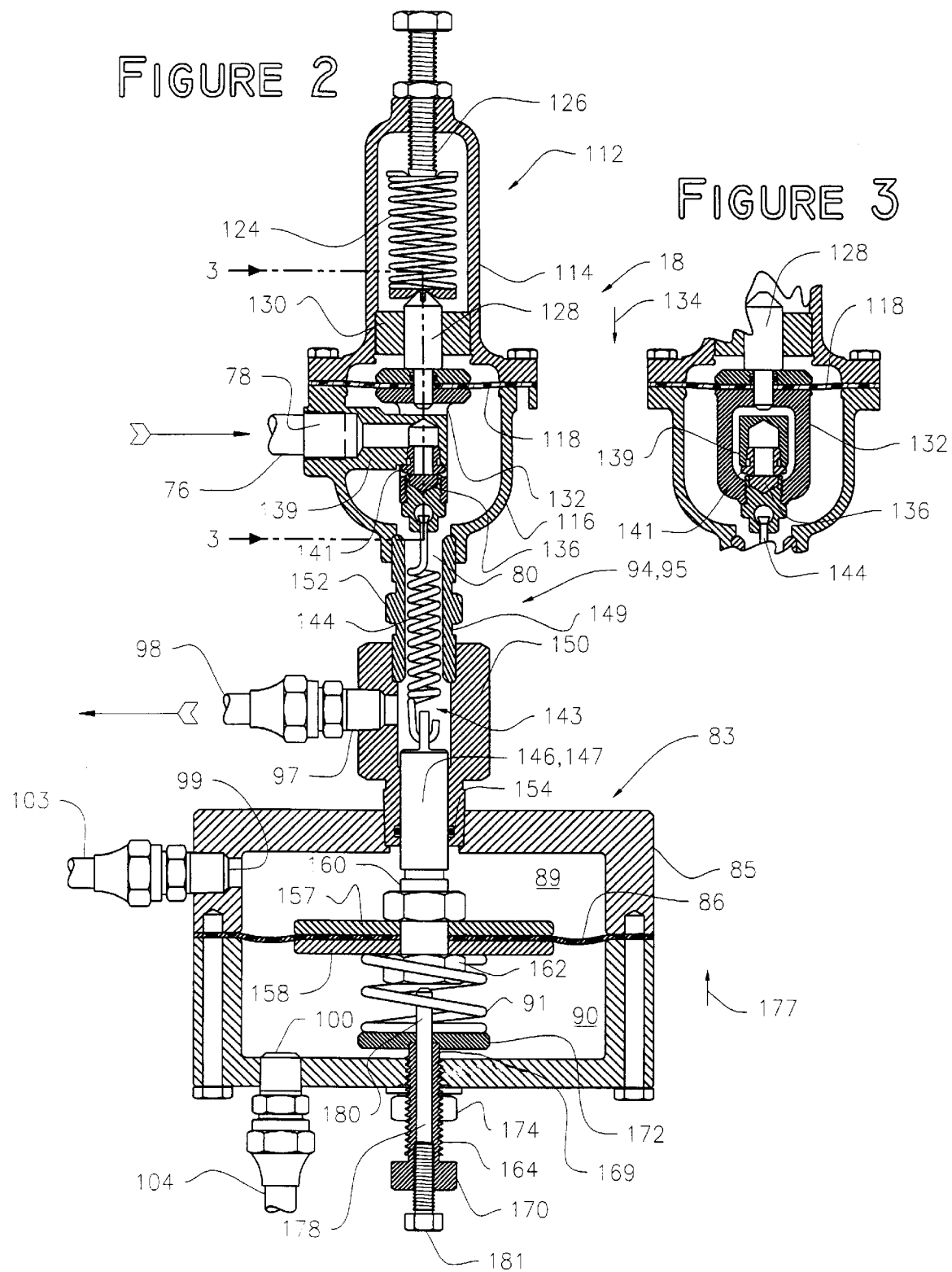

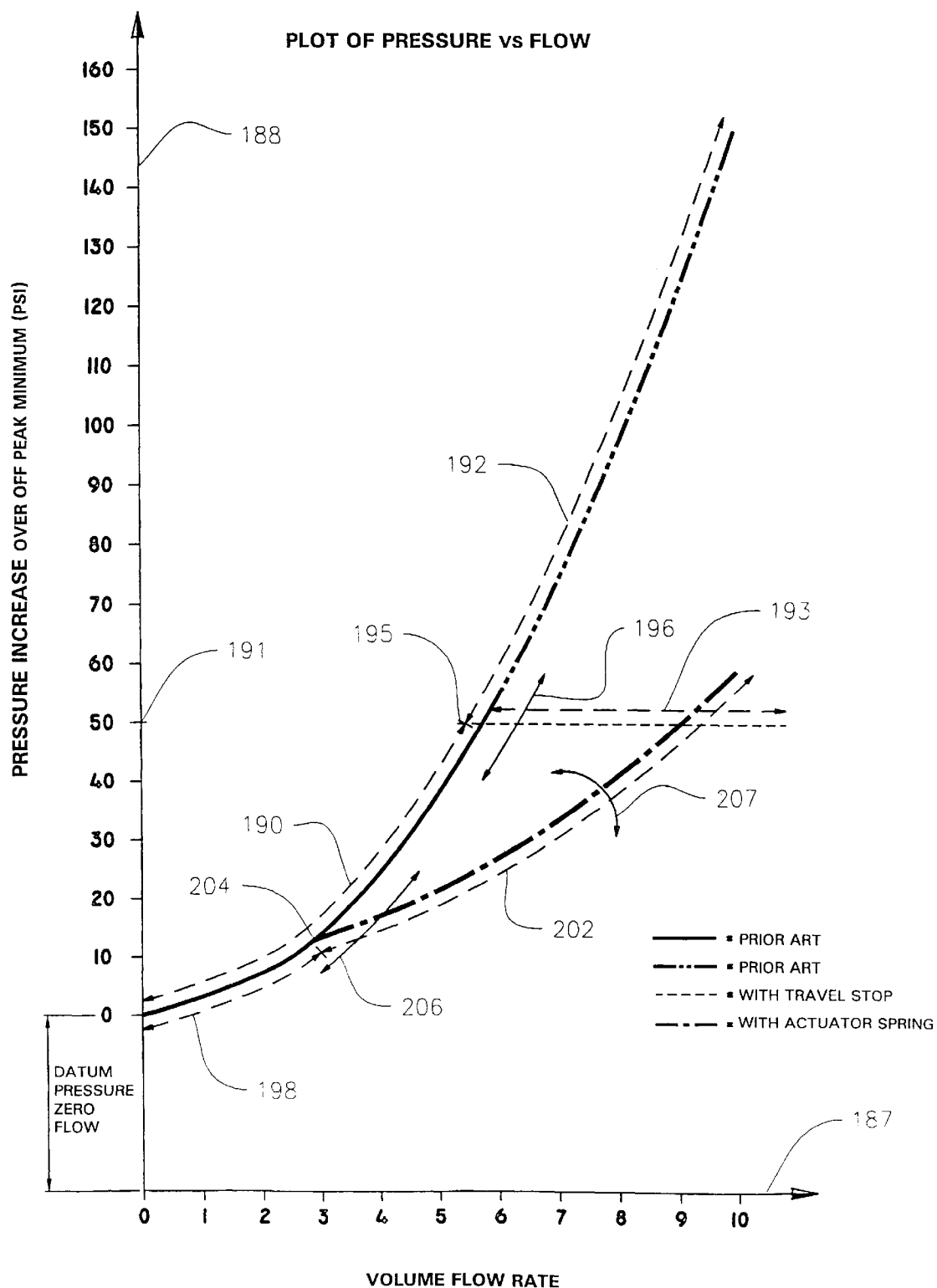

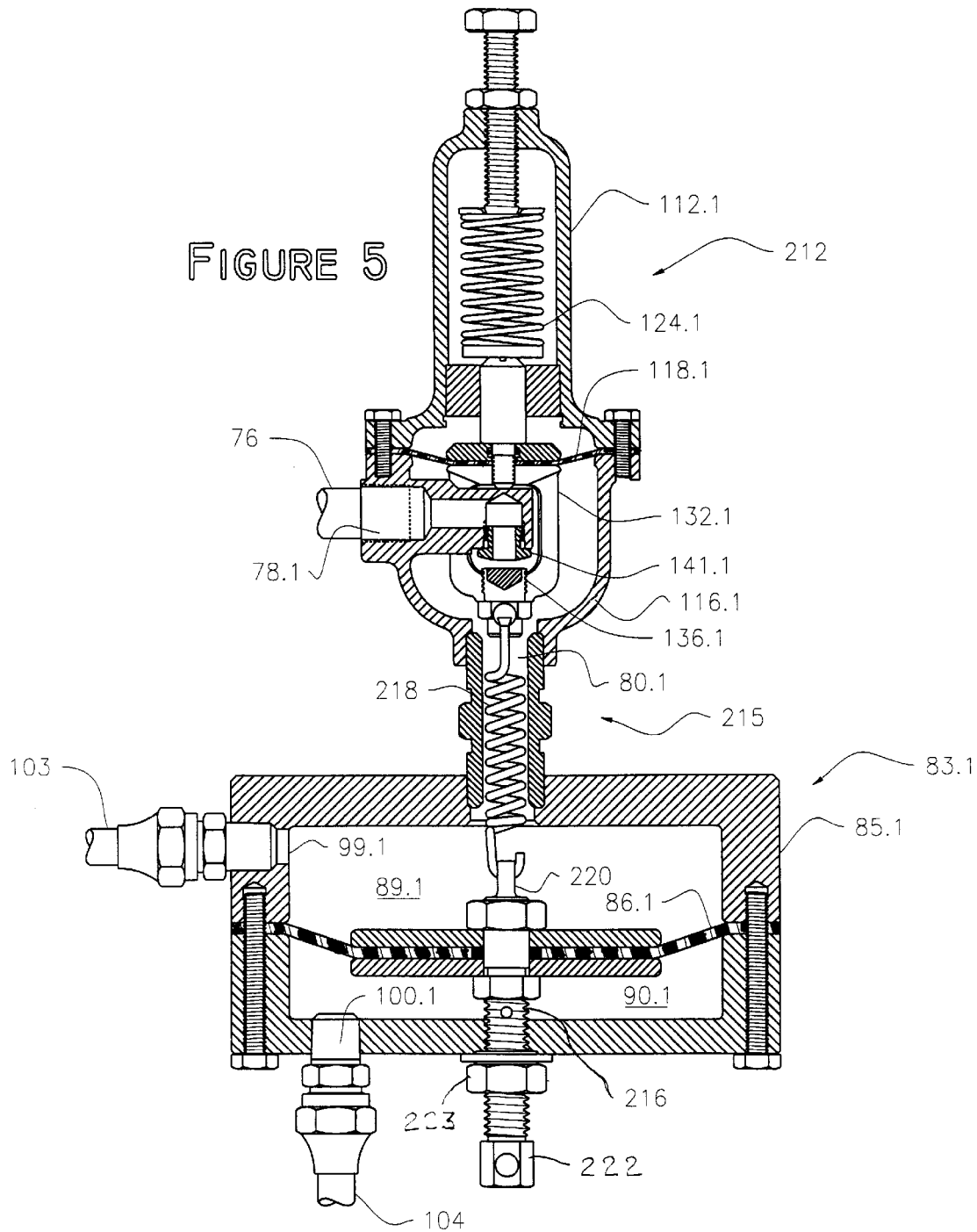

5,967,176

AUTOMATIC FLOW CONTROL VALVE WITH VARIABLE SET-POINTS

FIELD OF THE INVENTION

BACKGROUND OF THE INVENTION

The invention relates to an automatic valve commonly employed on municipal water utility systems, particularly to an automatic valve designed to control downstream pressure between selected set-points depending on the operation of the valve at a particular time.

Automatic pressure reducing valves are used in water distribution systems to reduce pressure to a pre-determined value or set-point that is adequate but does not expose normal components, such as household hot water tanks, to overpressure. The set-point is determined according to the use of the valve, and is a pressure downstream from the valve which the valve attempts to maintain constant for all flow conditions and is termed downstream pressure. Water distribution systems experience significant losses of drinking water due to leaks, and as volume lost through leakage is directly related to pressure in the system, the set-point is determined to provide minimum pressure that meets criteria of the water utility, particularly under maximum or "peak" demand conditions which can occur when fire is being fought. The pressure required for peak demand is usually significantly higher than that required for "off-peak" or typical night time conditions.

It is known to provide a valve which can vary the set-point and thus downstream pressure from the valve, so as to maintain the set-point relatively low for off-peak or night time operation, thus reducing losses in the pipe, and yet can raise the set-point during high flow demand for daily peak or special conditions such as occurring during fire fighting. To the inventor's knowledge, there are two main types of automatic flow control valves with variable set-points, namely, electronically controlled valves and "flow-driven" valves. The electronically controlled valves are relatively complex and require an electrical power source, such as batteries or access to utility power lines, and this increases installation costs and servicing costs and such valves are used in limited numbers. The flow-driven valves use fluid pressures to control actuation of the main valve, and thus are independent of external power sources and can be used in essentially any location.

One type of such valve is supplied by Bermad, a corporation of Evron, Israel. This valve has a flow sensor responsive to differential pressures which are applied on opposite sides of an actuator diaphragm. A rigid push rod transfers diaphragm movement to a controlling valve member of a pilot valve which in turn determines control pressure which actuates the main valve. The actuator diaphragm is immersed in fluid which severely limits movement thereof, and this restriction limits movement of the push rod and valve member thus reducing valve sensitivity. To the inventor's knowledge, such valves can be difficult to adjust, and are prone to instability resulting in wide pressure fluctuations. In addition, if the flow sensor is subjected to unusually high flow, the main valve can be opened excessively, resulting in excessively high downstream pressures which could cause damage to equipment and household appliances exposed to such pressure.

SUMMARY OF THE INVENTION

The invention reduces the difficulties and disadvantages of the prior art by providing an automatic "flow-driven" flow control valve with a variable set-point in which the valve is actuated by pressure forces generated by flow through the valve and thus is independent of external electrical power. In addition, the valve according to the invention minimizes effects of friction or inertia of components, thus improving valve performance and stability when compared with the prior art. In addition, the valve utilizes many existing valve components and thus is relatively simple to manufacture and service, and can be used as a "retrofit kit" to upgrade existing valve installations. Also, the present valve has adjustment means which provide a wide range of adjustment to accommodate a wide range of operating parameters.

A valve apparatus according to the invention comprises a pilot valve body, a flexible pilot diaphragm, first and second pilot valve members, an actuator apparatus and a resilient connector. The pilot valve body has a pilot inlet port and a pilot outlet port communicating with an interior of the valve body. The flexible pilot diaphragm divides the interior of the pilot valve body into first and second pilot chambers on opposite sides of the pilot diaphragm. The first and second pilot valve members cooperate with each other to control flow through the ports. The first pilot valve member is fixed relative to the pilot valve body and the second pilot valve member is responsive to the position of the pilot diaphragm. The actuator apparatus has an actuator body and a moveable actuator partition, the actuator partition dividing an interior of the actuator body into first and second actuator chambers. The actuator body has first and second actuator ports communicating with the first and second actuator chambers respectively. The resilient connector cooperates with the actuator partition and the pilot diaphragm to permit limited relative movement therebetween and to transfer a first resilient force to the pilot diaphragm resulting from movement of the actuator partition so as to vary location of the second pilot valve member and thus vary flow through the pilot valve ports.

An automatic fluid control system according to the invention comprises a main valve apparatus, a pilot valve apparatus, a T-junction, an inlet conduit, a control conduit, a pilot conduit, first and second pressure differential conduits, and a resilient connector. The main valve apparatus has a main valve body with an inlet port, an outlet port and a main valve seat disposed between the ports. The main valve apparatus further comprises a main valve member and a main valve diaphragm, the main valve member being moveable between an open position clear of the valve seat and a closed position engaging the valve seat. The main valve diaphragm cooperates with the main valve member and the main valve body to define a control chamber having a control port. The main valve member is responsive to control pressure within the control chamber acting on the main valve diaphragm. The pilot valve apparatus has a flexible pilot diaphragm, a pilot inlet port and a pilot outlet port, the ports communicating with one side of the diaphragm. The pilot valve apparatus also comprises an actuator apparatus having a moveable actuator partition, and first and second actuator ports communicating with opposite sides of the actuator partition. The T-junction has a T-inlet port, a T-control port and a T-pilot port. The inlet conduit communicates the inlet port of the main valve with the T-inlet port of the T-junction. The control conduit communicates the control port of the main valve with the T-control port. The pilot conduit communicates the pilot inlet port of the pilot valve apparatus with the T-pilot port. The first and second pressure differential conduits communicate with the first and second actuator ports respectively to apply a force to the actuator partition dependent on fluid flow through the main valve. The resilient connector cooperates with the actuator partition and the pilot diaphragm to permit limited relative movement therebetween and to transfer a first resilient force to the pilot diaphragm resulting from movement of the actuator partition so as to vary flow to the pilot valve apparatus.

A pilot valve apparatus according to the invention, comprises a pilot valve body, a flexible pilot diaphragm, first and second pilot valve members, an actuator apparatus and means to permit limited independent relative movement between the pilot diaphragm and an actuator partition. The pilot valve body has a pilot inlet port and a pilot outlet port communicating with an interior of the valve body. The flexible diaphragm divides the interior of the pilot valve body into first and second pilot chambers on opposite sides of the pilot diaphragm. The first and second pilot valve members cooperate with each other to control flow through the ports, the first pilot valve member being fixed relative to the pilot valve body and the second pilot valve member being responsive to position of the pilot diaphragm. The actuator apparatus has an actuator body and a moveable actuator partition, the partition dividing an interior of the actuator body into first and second actuator chambers. The actuator body has first and second actuator ports communicating with the first and second actuator chambers respectively. The means to permit limited independent relative movement between the pilot diaphragm and the actuator partition also transfers force from the actuator partition to the pilot diaphragm to vary flow through the valve, the means to permit said limited movement cooperating with the pilot diaphragm and the actuator partition.

A method according to the invention is for controlling fluid flow through a main valve to maintain downstream pressure substantially between two pre-determined set-points. The method comprises the steps of:

detecting inlet pressure in fluid flow adjacent an inlet of the main valve and generating a control pressure signal proportional to said inlet pressure;

transmitting a first portion of the control pressure signal to act on a main valve member of the main valve to control position of the main valve member based on flow through the main valve;

transmitting a second portion of the control pressure signal to a pilot valve apparatus to control flow therethrough, the pilot valve apparatus having a flexible pilot diaphragm;

generating two pressure differential signals to reflect the fluid flow rate through the main valve;

transmitting the pressure differential signals to opposite sides of a moveable actuator partition of an actuator to deflect the actuator partition in response to said pressure differential signal;

transmitting downstream pressure to the pilot diaphragm; and transmitting a resilient force to the pilot diaphragm arising from at least a portion of said deflection of the actuator partition so as to vary flow through the pilot valve, which in turn modifies the control pressure acting on the main valve member to re-position the main valve member to maintain downstream pressure substantially between the set-points.

A method according to the invention is for controlling fluid flow through a main valve to maintain downstream pressure substantially between two pre-determined set-points. The method comprises the steps of:

detecting inlet pressure in fluid flow adjacent an inlet of the main valve and generating a control pressure signal proportional to said inlet pressure;

transmitting a first portion of the control pressure signal to act on a main valve member of the main valve to control position of the main valve member based on flow through the main valve;

transmitting a second portion of the control pressure signal to a pilot valve apparatus to control flow therethrough, the pilot valve apparatus having a flexible pilot diaphragm;

generating two pressure differential signals to reflect the fluid flow rate through the main valve;

transmitting the pressure differential signals to opposite sides of a moveable actuator partition of an actuator to deflect the actuator partition in response to said pressure differential signal;

transmitting downstream pressure to the pilot diaphragm; and permitting limited independent relative movement between the pilot diaphragm and the actuator partition and transferring force from the actuator partition to the pilot diaphragm to vary flow through the pilot valve, which in turn modifies the control pressure acting on the main valve member to re-position the main valve member to maintain downstream pressure substantially between the set-points.

A detailed disclosure following, related to drawings, describes several embodiments of the invention, and related methods of operation, which embodiments and methods are capable of expression in structure and method other than those particularly described and illustrated.

BRIEF DESCRIPTION OF THE DRAWINGS

In drawings which illustrate embodiments of the invention,

FIG. 2 is an enlarged simplified fragmented section of the first embodiment of the pilot valve apparatus of FIG. 1, with the actuator diaphragm thereof being shown in an opposite partially downwardly deflected position to assist in opening the main valve;

FIG. 3 is a simplified fragmented section of line 3—3 on FIG. 2;

FIG. 4 is a simplified graphical representation of downstream pressure characteristics of the main control valve using the first embodiment of the pilot valve apparatus of FIGS. 1–3, and also showing a comparison with prior art pressure characteristics;

FIG. 5 is a simplified longitudinal section through a second embodiment of a pilot valve apparatus according to the invention, showing an actuator diaphragm fully deflected downwardly against a stop for opening the main control valve.

DETAILED DESCRIPTION

FIG. 1

Figure 1:
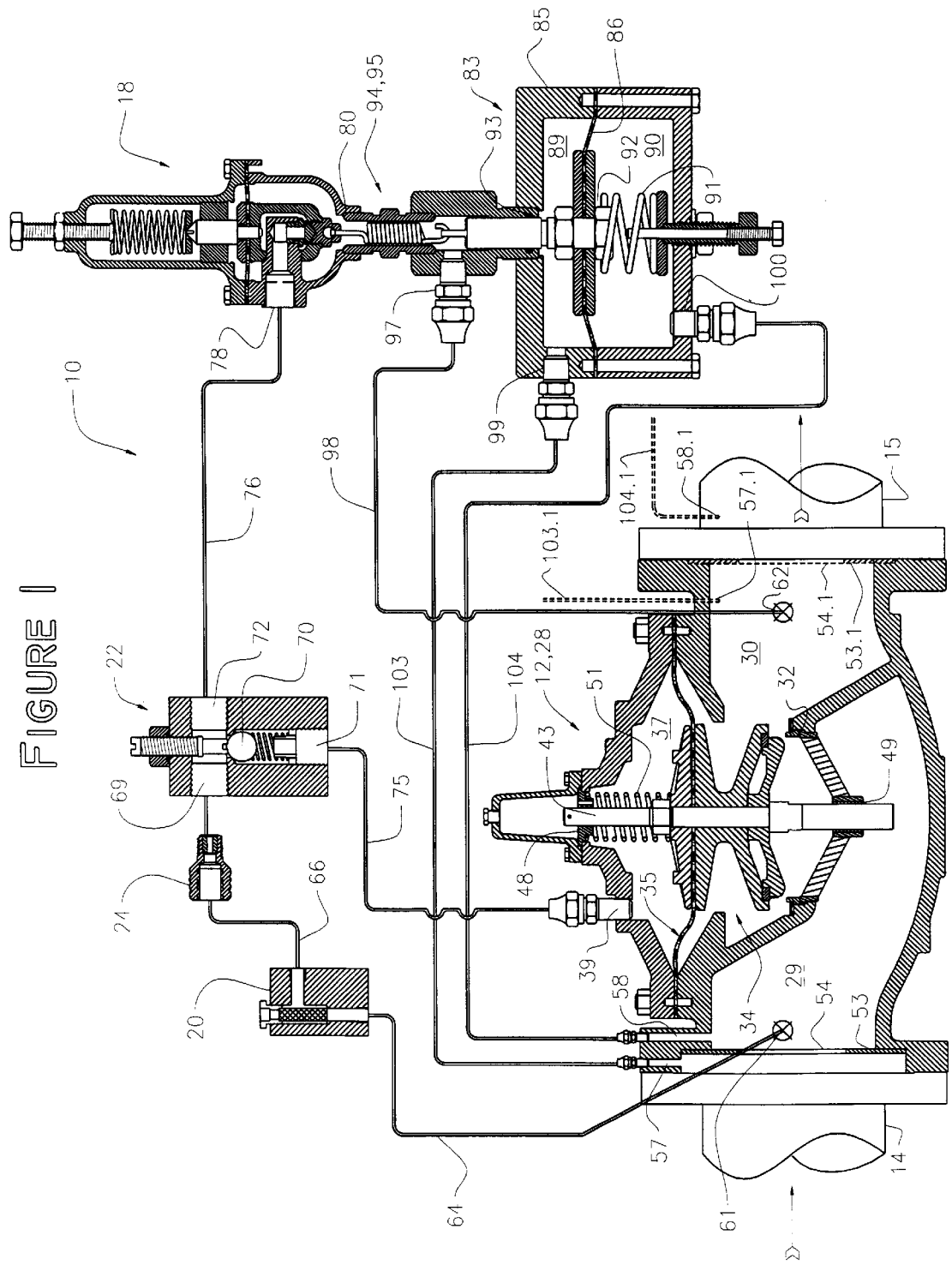
FIG. 1 is a simplified schematic of a first embodiment of the invention showing a pilot valve apparatus according to the invention coupled hydraulically to a conventional fluid actuated main flow control valve installed in a typical water line of a water distributing system, the main valve being shown partially open and an actuator diaphragm or partition of the pilot valve apparatus being shown deflected upwardly to assist in closing the pilot valve apparatus and the main valve.
Figure 6:
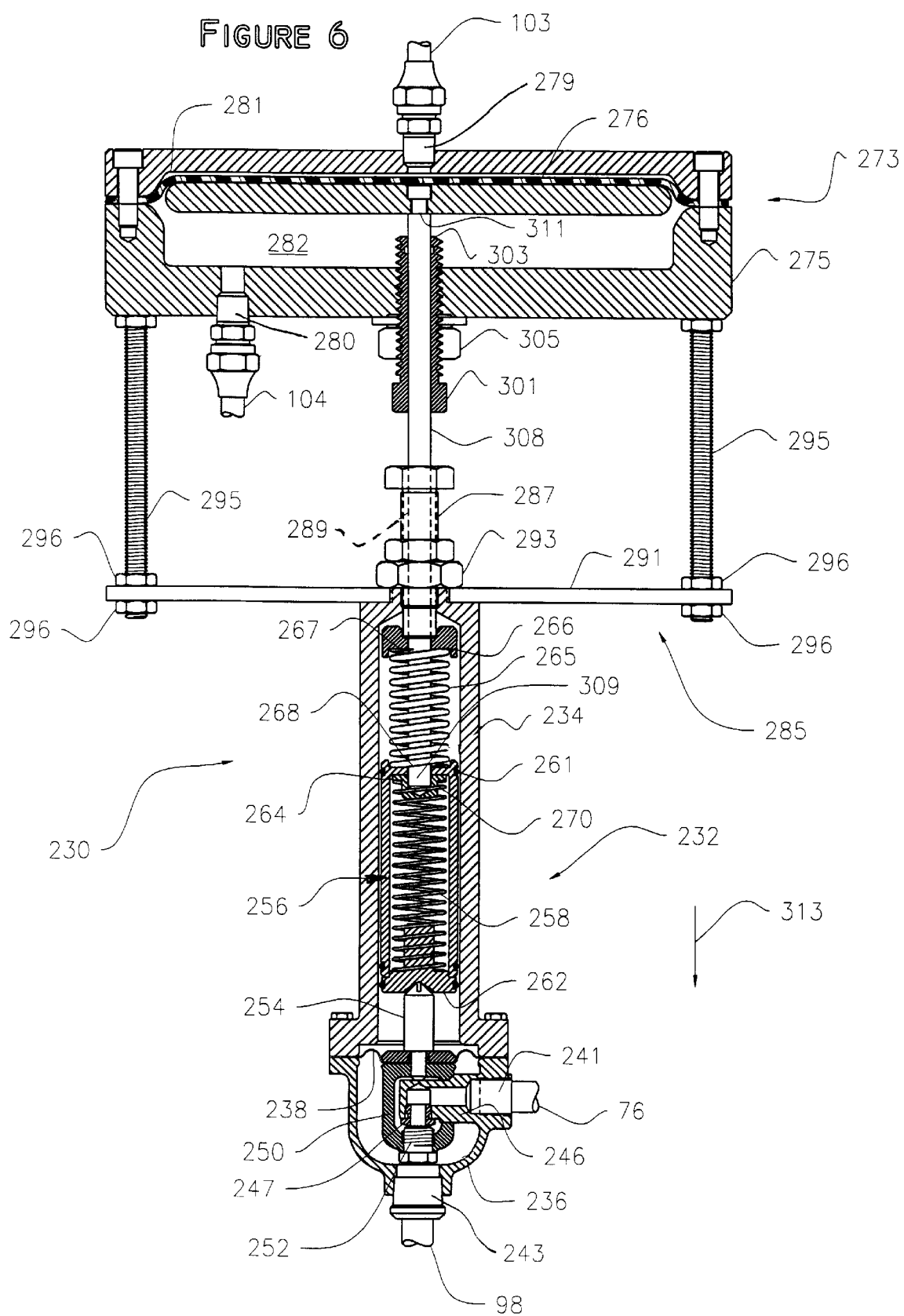
FIG. 6 is a simplified longitudinal section through a third embodiment of a pilot valve of the invention in which an actuator diaphragm thereof is shown in an upwardly deflected condition.

An automatic fluid control system 10 according to the invention comprises a conventional main flow control valve apparatus 12 fitted within inlet and outlet portions 14 and 15 of a water pipe to permit flow through the pipe. The system further comprises a first embodiment of a pilot valve apparatus 18 according to the invention, which is coupled hydraulically to the main valve through conduits as will be described. The system further comprises a conventional strainer 20 and a conventional T-junction flow stabilizer 22 which receives fluid through a metering orifice 24 as is common practise, the orifice 24 being shown separated from a body of the T-junction for clarity.

The main flow control valve apparatus 12 includes a main valve body 28 having an inlet port 29 communicating with the inlet portion 14, and an outlet port 30 communicating with the outlet portion 15. The valve apparatus 12 further comprises a main valve seat 32 disposed between the ports 29 and 30 and a main valve member 34 moveable between a fully open position and a closed position engaging the valve seat 32, neither of which positions are shown. The member 34 is shown in a partially open position. The valve apparatus further comprises a flexible main valve diaphragm 35 which has a central portion secured to the main valve member and an outer periphery secured to the valve body 28 to define a control chamber 37. The body 28 has a control port 39 communicating with the control chamber to pass fluid relative thereto. The valve member 34 is mounted on a guide stem 43 and has a seal which engages the seat 32 and has two complementary portions which sandwich the diaphragm 35 therebetween.

The valve body carries upper and lower valve guides 48 and 49 which mount the valve guide stem 43 for axial movement therethrough to permit the valve member 34 to be moved into and out of engagement with the valve seat to control flow through the valve. A main valve spring 51 is located within the control chamber 37 and extends between the valve member 34 and the valve body to apply a closing force on the valve member, in combination with fluid pressure within the control chamber 37 as will be described.

The above describes a conventional main flow control valve installed by many users to control flow through distribution pipes. While construction of the main control valve varies with each manufacturer, all valves known to the inventor use control pressure within a control chamber to open and close the main valve.

A sensor plate 53 is located adjacent the inlet port 29 and has a central orifice 54 which is smaller than the inlet and outlet ports 29 and 30 so as to restrict flow through the valve. First and second differential ports 57 and 58 are located adjacent the sidewall of the port 29 on upstream and downstream sides respectively of the orifice 54 to detect fluid pressures on either side of the orifice. The orifice 54 in combination with the first and second differential ports 57 and 58 serves as a main flow sensor which cooperates with the main valve so as to receive fluid flow passing through the main valve to reflect flow rate therethrough as is well known. Inlet and outlet pressure sensors 61 and 62 respectively are conduits communicating with the main fluid stream at the inlet and outlet ports 29 and 30 respectively to detect respective pressures therein, which pressures, together with the differential pressures at the ports 57 and 58, generate pressure signals to control actuation of the main valve 12 as will be described.

The control system 10 further comprises an inlet conduit 64 communicating with the inlet pressure sensor 61 at one end thereof, and with the strainer 20 at an opposite end thereof. An interconnecting conduit 66 connects the strainer to the metering orifice 24 which in practice will usually be secured directly into an inlet port 69 of the flow stabilizer 22. The flow stabilizer also has a control port 71 and a pilot port 72, the port 71 communicating with a spring-loaded ball valve 70 and flow adjustment means to control flow with respect to the control port 39, as is well known.

The control system 10 further comprises a control conduit 75 communicating the control port 39 of the main valve with the control port 71 of the flow stabilizer, and a pilot conduit 76 communicating the pilot valve apparatus 18 with the pilot port 72 of the flow stabilizer.

The pilot valve apparatus 18 comprises a pilot inlet port 78 and a pilot outlet port 80, the inlet port 78 communicating through the pilot conduit 76 with the port 72 of the flow stabilizer. The valve apparatus 18 further comprises an actuator apparatus 83 having a actuator body 85 and a flexible actuator diaphragm 86 sandwiched between complementary portions of the body 85 as shown to define first and second actuator chambers 89 and 90 on opposite sides of the diaphragm 86. An actuator spring 91 is located in the second chamber 90 and is a compression coil spring having an upper end spaced from the diaphragm 86 by a gap 92 when the diaphragm is displaced upwards as shown, for reasons to be explained with reference to FIGS. 2 and 4. The actuator body 85 has a connector opening 93 communicating with the first actuator chamber 89.

An important aspect of the invention relates to a main connector 94 with a connecting conduit 95 which extends between the connector opening 93 of the first actuator chamber and the pilot outlet port 80 so as to provide fluid communication therebetween and also a physical connection therewith as will be described. The main connector 94 has a drain port 97 which communicates the connecting conduit 95 with a drain conduit 98 extending to the outlet pressure sensor 62 to drain fluid from the pilot valve apparatus 18 and communicate an outlet pressure signal to the pilot valve diaphragm as will be described.

The actuator body 85 also has first and second actuator ports 99 and 100 which communicate with the first and second actuator chambers 89 and 90 respectively. A first differential conduit 103 extends between the first differential port 57 and the first actuator port 99, and a second differential conduit 104 extends between the second differential port 58 and the second actuator port 100. Flow through the orifice 54 generates a pressure differential between the ports 57 and 58, which differential is transferred through the conduits 103 and 104 to expose opposite sides of the actuator diaphragm 86 to the differential pressure which reflects flow through the main valve. In the condition shown in FIG. 1, the actuator diaphragm 86 is displaced upwardly due to the pressure difference between the first and second actuator chambers as will be described. It can be seen that the first and second actuator chambers are isolated from atmospheric pressure and the actuator diaphragm has a sufficiently large area to control position of the diaphragm in many circumstances, except when acted upon by other factors as will be described.

FIGS. 2 and 3

Referring mainly to FIG. 2, the pilot valve apparatus 18 also comprises a pilot valve body 112 having a spring chamber 114 and seat chamber 116 interconnected by undesignated fasteners and sandwiching a flexible pilot diaphragm 118 therebetween. The diaphragm thus divides the interior of the pilot valve body into first and second pilot chambers located on opposite sides of the diaphragm 118, namely the aforesaid spring chamber 114 and seat chamber 116 respectively. The spring chamber 14 has an adjustable spring stop 126 at a distal end and a guide stem 128 mounted for axial movement within a guide bushing 130 at a proximal end thereof, the stem and bushing being unsealed, ie. permitting airflow thereacross. A main pilot spring 124 extends between the adjustable spring stop 126 and the guide stem 128 to move the stem downwardly as shown.

Referring also to FIG. 3, the apparatus further comprises a valve yoke 132 located in the chamber 116, the yoke resembling a stirrup with an upper portion thereof connected to the diaphragm 118 and the guide stem 128 to move therewith as a unit. Thus, the main pilot spring effectively extends between the spring stop and the pilot diaphragm to apply a datum force to the pilot diaphragm in a first axial direction shown as arrow 134. The yoke has a lower portion carrying a resilient yoke seal 136 which faces upwardly and moves vertically in response to change in position of the pilot diaphragm. Thus, it can be seen that the main pilot spring 124 is located in the first pilot chamber or spring chamber 114 on a first side of the pilot diaphragm 118, and the valve yoke 132 is located in the second pilot chamber or seat chamber 116 on an opposite second side of the pilot diaphragm.

An inlet conduit 139 extends inwardly from a sidewall of the seat chamber 116, that is from the sidewall of the second pilot chamber to a peripheral conduit seat 141, the conduit seat 141 being received within the yoke 132 and facing downwardly to cooperate with the upwardly facing yoke seal 136 of the yoke. The conduit seat 141 serves as a first pilot valve member, and the yoke seal 136 serves as a second pilot valve member which cooperate with each other to control flow through the pilot inlet port 78, and thus through the valve apparatus 18. It can be seen that the first pilot valve member is fixed relative to the pilot valve body 112, and the second pilot valve member is responsive to position of the pilot diaphragm 118. Also, it can be seen that the pilot inlet port 78 and the pilot outlet port 80 communicate with the seat chamber or second pilot chamber 116 on the lower side of the pilot diaphragm 118. The above description of the pilot valve body 112, the diaphragm 118, the yoke and related structure closely resemble well known existing pilot valves used in related but different applications to control flow through main valves.

The present invention differs from the prior art in many aspects, one of which includes a resilient connector 143 extending through the connecting conduit 95 between the pilot diaphragm 118 and the actuator diaphragm 86 as follows. The resilient connector 143 comprises a tension coil spring 144, termed connector spring, and a connector seal 146 which are interconnected at adjacent ends and interconnect the yoke 132 and the actuator diaphragm 86. Because the yoke 132 is connected to the pilot diaphragm 118, it can be seen that the resilient connector interconnects the actuator diaphragm and the pilot diaphragm to transfer a first resilient force between the diaphragms for reasons to be described. The first resilient force from the connector 143 acts on the pilot diaphragm in the first axial direction per the arrow 134 so as to complement the datum force from the main pilot spring 124 as will be described. The connector seal 146 comprises a slidable cylindrical member 147 and a sealed seal sleeve 150 with a passage containing the member 147. The member 147 has an upper end clear of the drain port 97 and a lower end connected to the actuator diaphragm 86.

The main connector 94 comprises two main portions having aligned conduits or passages, namely an adjuster sleeve 149 and the seal sleeve 150. The adjuster sleeve 149 has oppositely screw-threaded outer ends which engage complementary respective screw-threads associated with the outlet port 80 of the pilot valve body 112 and an upper end of the seal sleeve 150, so that rotation of the adjuster sleeve varies spacing between the pilot valve body and the actuator body, similarly to a turnbuckle. Thus the sleeve 149 serves as a spacing adjuster and has a hexagonal section portion 152 to receive an open ended wrench to facilitate such rotation, as is well known. The seal sleeve 150 has an opposite end sealed and secured to the actuator body 85. The passage of the seal sleeve 150 is fitted with an annular resilient O-ring seal 154 which cooperates with the cylindrical member 147 to seal thereagainst to seal the connector opening 93 so as to prevent fluid passing between the connecting conduit 95 and the actuator body. Thus it can be seen that fluid leaving the second pilot chamber 116 passes through the pilot outlet port 80, into the passage of the adjuster sleeve 149 and through coils of the connector spring 144 and into the passage of the seal sleeve 150 and out through the drain port 97. Clearly, the drain port 97 is located on a side of the connector seal 146 remote from the actuator apparatus 83 to permit drainage of fluid from the pilot outlet port without interference with the actuator. The cylindrical member 147 has a cross-sectional area which is very small compared to effective area of the actuator diaphragm 86, so that pressure differences between fluid acting on the cylindrical member 147, and on the actuator diaphragm 86 have minimal effect.

The actuator apparatus 83 further comprises first and second actuator disks 157 and 158 carried on an actuator connector 160 and sandwiching the diaphragm 86 therebetween. The actuator connector 160 has an upper end secured to the connector seal 146 and a lower end with a hexagonal head 162 serving as one portion of a diaphragm stop as will be described. Thus, it can be seen that the resilient connector 143 extends through the pilot outlet port 80 and the connector opening 93 to connect to a first side of the actuator diaphragm 86 in the first actuator chamber 89.

The actuator apparatus 83 further comprises an outer adjuster screw 164 with an internally screw-threaded bore, and an external screw thread to cooperate with a complementary threaded bore within the actuator body 85 to provide axial movement of the adjuster screw 164 relative to the body. The adjuster screw has inner and outer ends 169 and 170 respectively, the inner end carrying a disc-like spring seat 172, and the outer end 170 having a hexagonal head which is engagable by a wrench to permit axial movement of the screw. A locking nut and washer 174 cooperate with the screw 164 to locate the screw with respect to the actuator. The actuator spring 91 is located between the spring seat 172 and the second actuator disk 158 and when the diaphragm 86 is deflected downwardly as shown, the gap 92 of FIG. 1 is eliminated and the spring is contacted at both ends. With sufficient downward deflection of the diaphragm 86, the spring 91 applies an upward force to the diaphragm 86 in a second axial direction shown as arrow 177 which is opposite to the first axial direction arrow 134 of a force generated by the spring 124. In other words, the actuator spring 91 has a length such that when the actuator diaphragm 86 is in raised position as shown in FIG. 1, the spring 91 has no effect on the diaphragm, whereas when the diaphragm moves downwardly towards the spring seat 172, the spring 91 eventually becomes compressed and thus selectively restricts movement of the diaphragm.

An inner adjuster screw 178 has inner and outer ends 180 and 181, the inner end 180 cooperating with the hexagonal head 162 to serve as a complementary portion of the stop so as to limit downwards movement of the actuator diaphragm in the first axial direction shown as the arrow 134. The outer end 181 has a hexagonal head which is engagable by a wrench held by an operator to permit adjustment to vary position of the inner end 180 which thus serves as an adjustable actuator stop. Clearly, the actuator stop is located in the second actuator chamber 90 and positioned to contact a complementary stop portion on a second side of the actuator diaphragm (i.e. the head 162) so as to limit displacement of the actuator diaphragm.

It can be seen that when the screw 178 cooperates with the head 162, it serves as an actuator stop cooperating with the actuator diaphragm so as to limit movement of the actuator diaphragm within the actuator body. Also, when the spring 91 is compressed, it serves as an actuator resilient member which cooperates with the actuator diaphragm to apply a second force to the actuator diaphragm to complement the first resilient force from the resilient connector 143. The screw 164 and seat 172 serve as a force adjuster cooperating with the actuator resilient member to delay initiation of or selectively vary the second resilient force applied to the actuator diaphragm.

OPERATION
FIGS. 1–4

Referring to FIG. 1, when the main valve apparatus 12 is open, the main valve member 34 is clear of the seat 32 and water flows through the inlet port 29, upwardly through the seat 32 and downwardly and outwardly through the outlet port 30. Inlet pressure in the flow is detected by the inlet pressure sensor 61 and a small amount of fluid flows along the inlet conduit 64, through the strainer 20 and the metering orifice 24 into the inlet port 69 of the flow stabilizer. Thus the pressure sensor 61 detects inlet pressure in fluid flow adjacent the inlet of the main valve, and metering of the flow along the inlet conduit 64 through the metering orifice 24 generates a control pressure signal reflecting the inlet pressure. The flow stabilizer 22 is effectively a metering T-junction which divides the control pressure signal into first and second signal portions of equal pressures. The first signal portion leaves the flow divider through the control port 71 to flow into the control conduit 75 where it is passed into the control chamber 37 of the main flow control valve apparatus 12. Pressure within the control chamber 37 is termed "control pressure" and this pressure acts upon the main valve member 34 and the diaphragm 35 to control position of the main valve member relative to the main valve seat 32 to control flow through the main valve. A downward force from the main valve spring 51 complements control pressure on the main valve member which is balanced by main fluid pressure acting upwardly on the member 34 while passing through the valve.

Referring also to FIG. 2, the second portion of the control pressure signal leaves the flow stabilizer 22 through the pilot port 72 and flows along the pilot conduit 76 into the pilot inlet port 78 and inlet conduit 139.

Flow through the inlet conduit 139 is controlled by spacing between the fixed conduit seat 141 and the moveable yoke seal 136. This spacing is determined by a balancing of the forces acting on the diaphragm 118 and the yoke 132 as follows. Downward force comprises the sum of forces from the main spring 124 and the tension coil spring 144, both of which act in the first axial direction of the arrow 134, plus fluid pressure in the conduit seat 141 acting on the seal 136. Fluid pressure within the second pilot chamber 116 acts upwardly on the pilot diaphragm 118 to balance the downward forces, and the resultant spacing between the conduit seat 141 and seal 136 varies between zero, when the seat and orifice are in complete contact and the pilot valve is closed, to approximately 1–2 mms, depending on the balance of forces and response of the system. Typically, the seal 136 oscillates or "trembles" over a smaller amplitude than the spacing above, typically less than 0.5 mms, ie. the spacing varies rapidly but minutely between the two narrower spacing limits due to resilience in the connector 143.

Fluid discharged from the conduit seat 141 passes into the seat chamber or second pilot chamber 116 and leaves the pilot outlet port 80 through the connecting conduit 95 by passing around the coils of the spring 144. The fluid leaves the conduit 95 by passing through the drain port 97, into the drain conduit 98 from where it flows into the sensor 62 and the outlet port 30 of the main valve. Fluid in the drain conduit 98 is subject to downstream pressure in the valve outlet portion 15 of the main valve, which is transmitted back to the seat chamber 116 of the pilot valve to act against the pilot diaphragm 118. Axial spacing between the actuator body 85 and the pilot valve body 112 is determined by relative rotation of the adjuster sleeve 149, and is selected so that when the conduit seat 141 contacts the seal 136, as seen in FIG. 1, an upper portion of the seat 146 is clear of the drain port 97.

This ensures that when the pilot valve is open there is always unrestricted drainage through the drain conduit 98 while preventing flow into the first actuator chamber 89.

Thus, the second portion of the control pressure signal is transmitted to the pilot valve apparatus 18, and when the pilot valve is sufficiently open the control pressure is reduced. When the pilot valve is opening, there is always a relatively low volume fluid inflow from the inlet conduit 64, but a greater outflow through the pilot conduit 76 and out through the drain conduit 98 due to outflow from the control chamber 37 as will be described. When the pilot valve closes, or at least trembles with a very small clearance between the seal 136 and the seat 141, flow in the pilot conduit 76 is reduced and control pressure in the control chamber 37 is increased due to continual inflow from the conduit 64, thus tending to close the main control valve 12. Following common practice, the flow capacity through the pilot valve apparatus 18 is greater than flow capacity through the conduits 64 and 66 and the metering orifice 24. In this way, if the pilot valve is fully open, most restriction to flow from the inlet pressure sensor 61 through to the outlet pressure sensor 62 occurs at the metering orifice 24, with some restriction also occurring in the inlet conduits 64 and 66.

The fluid flow into the main valve is restricted as it passes through the orifice 54 of the sensor plate 53, and this restriction results in a differential pressure existing between the differential ports 57 and 58. The pressure differential generates two different pressures, termed pressure differential signals for convenience, in the pressure differential conduits 103 and 104. The pressure differential signals are fed through the first and second actuator ports 99 and 100 into the first and second actuator chambers 89 and 90 to act on opposite sides of the actuator diaphragm 86. The pressure differential between the two differential signals reflects the speed of fluid flow through the orifice 54 and deflects the actuator diaphragm 86 accordingly. The actual position of the diaphragm 86 is responsive to the differential pressure plus any effects due to force from the spring 91 as will be described. Thus the first and second pressure differential signals are generated by detecting fluid pressures adjacent complementary portions of the orifice 54 which is positioned in series with the main control valve.

The following discussion assumes a steady state condition has been attained in which downstream pressure is at a lower set-point reflecting off-peak demand. The main valve member 34 is separated from the main valve seat 32 by a relatively small amount to produce a relatively small flow through the valve 12 and a corresponding lower differential pressure across the orifice 54 of the sensor plate 53. In this condition, the actuator diaphragm 86 is deflected upwardly as shown in FIG. 1 so that space between the yoke seal 136 and conduit seat 141 of FIG. 2 is sufficient to permit flow to balance forces generated by the metered flow through the metering orifice 24 of the flow restrictor, ie. flow in the pilot conduit 76 from the flow stabilizer 22. Thus, the connector spring 144 is relaxed and the actuator spring 91 is probably separated from the actuator diaphragm or is also generally relaxed due to a relatively small differential pressure between the ports 57 and 58, and the first and second actuator chambers 89 and 90. The reduced flow through the conduit 76 maintains a relatively high control pressure in the conduit 75, and thus in the control chamber 37 so as to apply a relatively high closing force on the main valve member 34 so as to maintain relatively low flow through the main flow valve 12. Flow from the conduit 76 passes through the valve outlet port 80, the drain port 97 and the conduit 98 into the outlet port 30 of the main valve 12. Downstream pressure in the port 30 is transmitted in the conduit 98 to the seat chamber 116 and acts upwardly against the pilot diaphragm. If there is no additional tension in the spring 144, the pilot valve establishes a set-point that is dependent on the main pilot spring 124 and downstream pressure in the seat chamber 116, and thus operation of the valve is similar to a conventional pressure reducing pilot valve and there is no change in function between the conventional valve and the present valve.

When there is an increase in demand for additional water downstream from the main valve, eg. fire fighting demand, daily peak periods, additional flow demand due to irrigation, etc., for a short while pressure at the outlet port 30 decreases. This decrease in downstream pressure causes a corresponding decrease in pressure in the seat chamber 116, causing flow through the pilot valve to increase. This flow increase reduces control pressure causing the main valve to open with the corresponding increase in flow through the main valve. The main flow increase correspondingly increases the differential pressure between the ports 57 and 58 and thus between the first and second actuator chambers 89 and 90. This differential pressure increase causes an increase in downward force on the actuator diaphragm 86 which thus moves downwardly from the position shown in FIG. 1 towards that shown in FIG. 2. If the pressure differential is sufficiently large, the actuator diaphragm stop or hexagonal head 162 contacts the inner end 180 of the adjuster screw 178, thus preventing further downward movement of the diaphragm 86 and limiting extension of the spring 144 and thus limiting any further increase in downstream pressure. This aspect of the operation differs from the prior art and there are two distinct stages of downward deflection of the diaphragm 86 as follows. Because the actuator spring 91 is not pre-loaded and the gap 92 (FIG. 1) is usually present, initial downward movement of the actuator diaphragm is opposed by the tension in the spring 144 but can be unrestricted by the spring 91, until the spring 91 is contacted. As the diaphragm moves further downwardly, it experiences an increasing resistance from the spring 91 until further downward movement is prevented by contact with the inner end of the adjuster screw 178 as previously described.

In situations where there is only a moderate increase in flow demand, differential pressure forces on the actuator diaphragm are insufficient to cause the diaphragm to contact the screw, and downward movement of the diaphragm eventually stops when forces on the actuator are balanced as follows. Downward movement of the diaphragm 86 increases tension on the connector spring 144 which in turn draws the yoke 132 downwardly, so as to increase clearance between the yoke seal 136 and the conduit seat 141. This increases flow into the pilot inlet port 78 with a corresponding increase in flow through the pilot conduit 76 from the flow stabilizer 22. The increase in flow into the pilot valve passes through the connecting conduit 95 and out through the drain port 97 and drain conduit 98 into the outlet port 30 of the main valve.

The increase in flow in the conduit 76 is greater than the flow in the conduits 64 and 66 because the flow in those conduits is restricted by the orifice 24. This difference in flow volume is compensated by additional flow from the conduit 75 which in turn reduces control pressure in the conduit 75, which in turn reduces control pressure in the control chamber 37 of the flow control valve 12. Reduction in control pressure causes the main valve member 34 to move upwardly away from the valve seat 32, thus opening the main valve further. This increases volume flow through the main valve 12 which increases downstream pressure and this continues until the fluid draining from the flow stabilizer 22 through the control conduit 76 is reduced by closure of the pilot valve as follows. When downstream demand stabilises at a higher peak demand, outlet or downstream pressure sensed by sensor 62 stops decreasing, and the resulting higher downstream pressure is transmitted through the conduit 98 to produce a corresponding increase in pressure in the pilot chamber 116, which in turn increases upward force on the pilot diaphragm 118. When upward force on the pilot diaphragm 118 is higher than combined downward forces thereon from the main pilot spring 124 and the tension coil spring 144, the gap between the yoke seal 136 and conduit seat 141 becomes smaller. The flow through the inlet port 78 is reduced or may eventually stop, which then permits the continuous flow through the orifice 24 to increase pressure in the pilot conduit 76, with a corresponding increase in control conduit 75 and chamber 37. As control pressure increases in the chamber 37, the main valve member 34 moves downwardly again to reduce flow through the main valve. The main valve member may execute a few damped oscillations depending on response of the system. It has been found that the yoke tends to oscillate or "tremble" rapidly in a very small amplitude, and this trembling is attributed to the relatively fast response and yet adequately damped system. Clearly, resilience in the connector spring permits this trembling, which is not possible in the Bermad device which has a rigid connection between the actuator diaphragm and the valve mechanism. When the new higher pressure set-point is reached, the flow is maintained at the higher flow rate until demand is reduced below peak flow demand, at which time control pressure is again increased in the control chamber 37 producing further closure of the main valve member in a reverse sequence to that previously described.

Thus, it can be seen that an important aspect of the method of the invention relates to transmitting a resilient force to the pilot diaphragm 118 arising from at least a portion of the deflection of the actuator diaphragm 86 so as to vary flow through the pilot valve. This in turn modifies the control pressure acting on the main valve member 34 to maintain downstream pressure substantially between the set-points. It is noted that the main pilot spring 124 transmits the datum force to the pilot diaphragm in the first axial direction based on the predetermined downstream pressure, and the datum force on the pilot diaphragm is complemented with the resilient force applied or transferred by the resilient connector to vary flow through the pilot valve apparatus. It can be seen that the actuator spring 91 can apply a second resilient force to the actuator diaphragm which force selectively increases proportionately to displacement of the actuator diaphragm from an initial position in which the second resilient force applied to the actuator diaphragm is zero or a minimum, that is when the gap 92 is eliminated by actuator diaphragm displacement. It can be seen that the resilient connector 143 serves as a means to limit independent relative movement between the pilot diaphragm and the actuator diaphragm and to transfer force from the actuator diaphragm to the pilot diaphragm to vary flow through the pilot valve.

The present invention is far more versatile than any other valves known to the applicant and it provides several factors which can be adjusted so that the valve characteristics match particular operating criteria of a water utility or other user. Most of these characteristics can be adjusted externally of the valve apparatus 18 by rotating one or more of three adjustment screws 126, 164 and 178 as follows. Rotation of the spring stop 126 acting on the main pilot spring 124 varies the datum force on the yoke and diaphragm 118, and thus establishes the lower set-point or minimum downstream pressure for off-peak periods, typically 40 psi. In contrast, rotation of the inner adjuster screw 178 varies location of the actuator stop, which in turn establishes the higher set-point or maximum downstream pressure that arises in a high demand or peak situation. Also, rotation of the outer adjuster screw 164 varies position of the spring, and thus the gap 92 between the actuator diaphragm and the spring, thus controlling initiation of resistance to downward movement of the actuator diaphragm. Thus, rotation of the outer adjuster screw 164 serves as a force adjuster to vary initiation of the second resilient force applied to the actuator diaphragm. In addition, spacing between the diaphragms 118 and 86 can be adjusted by rotating the adjuster sleeve 149, which serves as a spacing adjuster located between the pilot valve body and the actuator body to vary spacing therebetween to permit adjustment of the first resilient force applied by the resilient connector to the yoke. In addition, strengths of three springs 124, 144 and 91 can also be selected to suit particular criteria. In addition, two or more springs, possibly of different lengths can be fitted to vary spring rate characteristics, particularly for the actuator spring 91, which again increases the variability of the present invention. In general, the sizes and lengths of the springs are selected so that as the connector spring 144 extends, initially there is no resistance from the spring 91. Eventually, spring 91 is contacted and then further downward movement of the actuator diaphragm is restricted by an increasing force from both springs 144 and 91.

Thus the present valve can be used to control a wide range of sizes of main flow control valves 12 to attain specific operating criteria. This wide range of adjustment is best understood by reference to FIG. 4 which shows pressure versus flow curves and characteristics of downstream pressure of a control valve controlled by a typical prior art "flow-driven" automatic pilot valve, and also by the present valve. In FIG. 4, horizontal axis 187 represents volume flow through the valve, and vertical axis 188 represents increase in pressure over an off-peak minimum pressure, both axes having arithmetic scales. Off-peak minimum pressure for a water utility could be typically about 40 psi, which represents an off-peak low demand situation as occurring at night without fire fighting requirements or other emergencies and is designated as 0, but is located above the graph origin to illustrate datum pressure at zero flow.

A first portion 190 of the curve is based on conventional formula, and is generally parabolic and represents flow through a prior art valve without electric control. Low flow through the present valve follows the same curve. In a prior art valve, a peak demand for water flow can result in excessive downstream pressures shown by a second portion 192 of the curve, which is a parabolic continuation of the first portion 190 in which increased pressures can damage equipment exposed to the increased downstream pressure. In contrast, in the present invention, a demand for high fluid volumes results in downward displacement of the actuator diaphragm 86 until the actuator diaphragm stop 162 contacts the inner end 180 of the screw 178, limiting further downward movement of the diaphragm. This limits downstream pressure to a predetermined upper set-point designated 191, and further increases in volume flow through the valve results in a third portion 193 of the curve extending generally horizontally from a curve junction 195 as shown. This reflects no further increase in downstream pressure for increases in volume flow rate. Thus, the provision of the actuator diaphragm stop limits downstream pressure to the upper set-point 191 and this set-point is easily adjustable by screwing the screw 178 inwardly or outwardly depending on criteria requirements. Thus, unscrewing the screw 178 further outwardly, ie. downwardly, allows increased deflection of the diaphragm and permits attainment of a higher pressure, whereas screwing the screw 178 inwardly, ie. upwardly, further reduces actuator diaphragm movement and reduces the increase in downstream pressure, ie. this results in lowering the upper set-point 191. This type of adjustment therefore results in vertical and parallel movement of the third portion of the curve 193 in accordance with double-headed arrow 196. It can be seen that the addition of the adjustable stop provided by the screw 178 provides a simple and effective external means of adjusting upper limits of downstream pressure occurring in high or peak demand conditions.

In addition, the actuator spring 91 also varies characteristics of the present invention when compared with prior art. The outer adjuster screw 164 and the associated spring seat 172 may be positioned to provide the gap 92 and consequently, the spring 91 would generate zero force on the actuator diaphragm 86 for certain positions of the diaphragm 86 within the actuator chamber. This is reflected in an initial portion 198 of the first portion 190 of the curve which is similar to the prior art because the spring 144 transmits the differential force from the actuator diaphragms without modification from the actuator spring or actuator stop. However, following this initial downward movement of the actuator diaphragm limited only by force from the extension spring 144, eventually the diaphragm 86 contacts the actuator spring 91 so that the gap 92 is closed, shown as a junction 204 in FIG. 4. Hence, further downward movement of the actuator diaphragm is resisted by the spring 144 plus an increasing compression force from the actuator spring 91. The force transmitted to the pilot diaphragm 118 by the spring 144 depends only upon extension of the spring 144. Thus increasing compression force of the spring 91 modifies the diaphragm movement in response to increasing differential pressures, which changes the first portion 190 of the curve to a modified curved portion 202 which extends upwardly from the junction 204 with the first portion 190 of the curve. Additional downward deflection of the diaphragm 86 is resisted by additional compression of the spring 91, which reduces the increase in downstream pressure when compared with operation without the spring 91.

Clearly, if the outer adjuster screw 164 is screwed upwardly and inwardly, the spring seat 172 moves upwardly, further compressing the spring 91 which results in shifting of the junction 204 of the modified curve 202 downwardly. In contrast, downward extension of the screw 164 from the chamber 90 would result in upward shifting of the curve 202. These two types of adjustment are reflected by the double-headed arrow 206. By providing the outer and inner adjuster screws 164 and 181 with separate screw threads, independent adjustment of the inner and outer screws is possible so as to vary relatively independently the vertical position of the third portion 193 of the curve. The slope of the modified curved portion 202 of the curve, as designated by a double-headed arrow 207, may be altered by selecting multiple springs 91 of different lengths and stiffnesses thus providing a very versatile valve. Also, the strength and effective length of the tension spring 144 can be varied by substituting different springs, and also by rotating the adjuster sleeve 149 to vary spacing between the bodies 112 and 85.

In summary, it can be seen that an important structural difference between the present invention and the prior art is the provision of the resilient connector 143 (ie. the spring 144) between the yoke and the actuator diaphragm 86. This permits small independent movements of the yoke with respect to the actuator diaphragm which is attributed to the improved performance of the present invention over the prior art devices. It has been noted that the yoke trembles essentially constantly when the device is operating as a pressure reducing pilot valve. The provision of the resilient connection permits the actuator diaphragm assembly to move essentially independently of the yoke until forces on the actuator diaphragm are balanced, or until the actuator diaphragm contacts the actuator stop.

The resilient connector permits somewhat substantial movement of the diaphragm, in contrast with the Bermad valve which has very limited movement. The substantial movement of the present valve is determined by spring rate of the tension spring 144, pressure of differential signals across the actuator diaphragm, and the area of the diaphragm. The actuator stop and/or the actuator spring can be employed to modify movement of the diaphragm, which in turn changes the force on the tension spring applied to the yoke. Typically, area of the actuator diaphragm 86 is considerably larger than area of the pilot diaphragm 118, ratio of areas being between about 6 and 12, with a preferred ratio being about 10. This area ratio permits an adequate range of adjustment of the various factors to enable use of a relatively small pilot valve apparatus 18 to control a typical range of main flow control valve apparatus 12. In one example, actual movement of the actuator diaphragm is typically between 1 and 4 cm, which is suitable to provide a spacing between upper and lower set-points of 30 psi for an actuator diaphragm having an area of 100 sq. cm. and a pilot diaphragm having an area of 10 sq. cm. when using springs which are easily commercially available . Clearly, other values for are ratios, sizes, etc. could be selected for appropriate operational criteria.

ALTERNATIVES

The sensor plate 53 with the central orifice 54 and the associated differential ports 57 and 58 serve as a main flow sensor to reflect fluid speed, and therefore volume flow, through the main valve 12. While the orifice and differential ports are located upstream of the main valve, in an alternative shown in broken outline in FIG. 1, they could be located downstream of the valve with suitable adjustments to operation of the apparatus in view of metering of flow through the main valve itself.

Alternatively, the sensor plate 53 and orifice 54 could be eliminated and a well known conventional venturi tube substituted, with corresponding differential ports which would cooperate with the differential conduits 103 and 104 in a manner generally similar to the sensor plate and orifice. Similarly to the sensor plate, the venturi tube could be located either upstream or downstream from the main valve so that at least a portion of the fluid flow passing through the main valve would pass through the venturi meter. In yet a further alternative, differential pressures to reflect fluid flow could be obtained by use of a pitot tube located in the main flow with one port facing upstream to detect dynamic pressure, and another port positioned to detect static pressure, so that two differential pressure signals are obtained which would similarly be communicated to the first and second differential conduits 103 and 104 as previously described. In all flow speed sensors described above, two pressure signals are obtained which are used to produce a differential pressure signal which is applied to the actuator diaphragm to displace the actuator diaphragm in an appropriate direction.

The resilient connector 143 is shown as a tension coil spring, ie. it elongates and contracts when exposed to tensile forces. Alternative resilient connectors can be substituted, for example elastomeric materials, provided clearance exists between the resilient connector and the connecting conduit to pass fluid therebetween.

While the actuator diaphragm 86 is shown to be generally planar for simplicity and low cost, alternative structures to partition the actuator chamber into first and second chambers can be substituted. For example, to accommodate relatively large deflections of the actuator diaphragm, a rolling diaphragm can be substituted for the planar diaphragm 86. In addition, a piston with sliding cup seals to partition the actuator interior can be substituted. While the piston introduces some sliding friction, effects of this can be minimized. In any event, the interior of the actuator chamber is divided by a moveable partition into the first and second actuator chambers and this term is used in the claims to cover such structures.

Also, the flow stabilizer 22 is shown with the metering orifice 24 fitted upstream of the inlet port 69 thereof. If the inlet conduit 64 and interconnecting conduit 66 had relatively small bores, these conduits by themselves could provide an adequate restriction to flow similar to the restriction provided by the metering orifice 24, which thus could be eliminated. Thus, the flow stabilizer 22 could be a simple T-junction, and flow therethrough would be dependent on fluid restriction along the conduits 64 and 66.

FIG. 5 with brief reference to FIG. 1

A second embodiment 212 of a pilot valve according to the invention has many components which are identical to components used in the first embodiment 18 of FIGS. 1–3, and thus identical components in the second embodiment are designated with the same numerical reference as that used in the first embodiment, with the addition of .1. Thus, the second embodiment 212 has a main pilot spring 124.1 which applies a downward force to the pilot diaphragm 118.1 to which is connected the valve yoke 132.1. The pilot inlet port 78.1 receives fluid from the flow stabilizer 22 (FIG. 1) through the pilot conduit 76 and flow through the conduit seat 141.1 is controlled by spacing of the yoke seal 136.1. The actuator diaphragm 86.1 divides the actuator apparatus 83.1 into first and second actuator chambers 89.1 and 90.1, which have actuator ports 99.1 and 100.1 respectively as before described.

There are several main differences in structure between the first and second embodiments 18 and 212 and respective fluid connections as follows.

Referring to FIG. 1, the sensor plate 53 and its central orifice 54 have been re-positioned from adjacent the inlet port 29 to adjacent the outlet port 30, as shown in broken outline at 53.1 and 54.1 respectively. Correspondingly, the first and second differential ports 57 and 58 of FIG. 1 have been eliminated from adjacent the inlet port, and alternative first and second differential ports 57.1 and 58.1 have been substituted to be upstream and downstream from the orifice 54.1. Consequently, first and second differential conduits 103 and 104 now extend from the first and second differential ports 57.1 and 58.1 to the first and second actuator ports 99.1 and 101.1.

Referring again to FIG. 5, the pilot outlet port 80.1 communicating with the seat chamber 116.1 is connected to the actuator body 85.1 by an alternative connecting conduit 215 which communicates directly with the first actuator chamber 89.1. Consequently, the connector seal 146 and associated sealing sleeve 150, the drain port 98 and associated drain conduit 98 have been eliminated. Also, for simplicity, downward movement of the diaphragm 86.1 is shown to be limited only by an alternative actuator stop 216, and the actuator spring 91 of FIG. 2 and associated structure are not shown but could be fitted.

An alternative tension coil spring 218 is located in the conduit 215 and extends directly between the yoke 132.1 and a ring 220 within the chamber 89.1 extending upwardly from the diaphragm 86.1. Because the seal 146 of FIG. 2 has been eliminated, fluid leaving the outlet port 80.1 of the pilot valve passes freely down the alternative connecting conduit 215 through coils of the spring 218, and then into the first actuator chamber 89.1. Thus, the alternative resilient connector or tension coil spring 218 provides a clearance through the connecting conduit 215 to permit fluid to flow between the second pilot chamber or seat chamber 116 and the first actuator chamber 89. Fluid leaves the first actuator chamber 89.1 through the first differential conduit 103.1 to flow into the outlet port 30 through the alternative differential pressure port 57.1. In contrast with the first embodiment, where the first and second differential pressure conduits are "low-flow" conduits which merely transmit pressure signals with negligible flow therethrough, the alternative first differential conduit 103.1 also serves as the drain conduit, and thus at times is subject to considerable flow from the second embodiment 212 and therefore is a larger diameter conduit than the differential conduit 103 of FIG. 1. In contrast, the second differential conduit 104.1 can be similar to the differential conduit 104 of FIG. 1 as it serves to transmit only pressure signals from a location downstream of the orifice.

Thus, because the separate drain conduit 98 extending between the main valve 12 and the pilot valve apparatus 18 of FIG. 1 has been eliminated, together with some additional complexity in the connecting conduit 95 between the pilot valve body 112 and the actuator body 85, the embodiment 212 is somewhat simpler to install. In addition, the alternative actuator stop 216 is also simpler and comprises a conventional bolt 222 and locking nut 223 which locates the bolt in a particular location within the second actuator chamber so as to limit downward movement of the diaphragm as shown in FIG. 4.

Operation of the second embodiment 212 follows very closely that of the first embodiment 18. However, if the actuator spring 91 of FIG. 2 is eliminated, the modified curve 202 as shown in FIG. 4 is not available, but an actuator spring and an adjustable spring seat could be fitted if needed.

Thus, the characteristic of the second embodiment 212 as presently shown would include the first portion 190 and the third portion 193. It is added that, because the flow discharged from the pilot outlet port 80.1 passes into the first actuator chamber 89.1 and mixes with the first differential pressure signal in the conduit 103.1, this mixing and additional fluid flow in the conduit 103.1 tends to produce more difficulty in setting up the second embodiment 212 of the valve when compared with the first embodiment.

In summary, the main difference between the first and second embodiments 18 and 212 relate to re-positioning of the orifice 54 from an upstream position of the main valve to a downstream position thereof, and combining the drain conduit 98 of FIG. 1 with the differential conduit 103.1. This conduit is connected to the new first differential pressure port 57.1 and is closely adjacent, or can be coincident with the outlet pressure sensor 62 of FIG. 1. This results from eliminating the connector seal 146 of FIG. 1, and permitting fluid to drain from the pilot valve apparatus to pass straight into the first actuator chamber.

FIG. 6

A third embodiment 230 of a pressure pilot valve apparatus according to the invention differs from the previous two embodiments by substituting a compression coil spring for the tension coil springs 144 and 218 of FIGS. 2 and 4. Thus, forces between the pilot diaphragm and actuator diaphragm are reversed when compared with the first two embodiments. This results in an "inversion" of many of the components with additional structure that is considered to be more complex and less desirable. However, the third embodiment could have applications in specific areas where the first or second embodiment would not be appropriate particularly where it is not practical to fit a tension member between the pilot diaphragm and the actuator diaphragm because of a particular design of the pilot valve. Alternatively, the third embodiment would be appropriate in a retro-fit situation where an existing valve can be modified to be fitted with the third embodiment of the pilot valve apparatus 230.

The third embodiment 230 has a pilot valve body 232 having a spring chamber 234 and an seat chamber 236, with a flexible pilot diaphragm 238 sandwiched therebetween. The seat chamber 236 has a pilot inlet port 241 connected to the pilot conduit 76, and a pilot outlet port 243 connected to the drain conduit 98, the conduits 76 and 98 being connected to the other components of the circuit 10 as shown generally in FIG. 1.

The third embodiment 230 has a valve conduit 246 extending inwardly from the chamber 236 to a downwardly facing conduit seat 247. A valve yoke 250 is connected to the pilot diaphragm 238 and has an upwardly facing yoke seal 252 which cooperates with the conduit seat 247 to control flow through the inlet port 241. A stem 254 extends on a side of the diaphragm 238 remotely from the yoke into the spring chamber 234.

A spring container 256 is located within the spring chamber 234 of the pilot valve body and contains a compression coil spring 258. The spring container has a distal end portion 261 and a proximal end portion 262, and the spring 258 extends between the proximal end portion 262 and a connector seat 264 located within the spring container adjacent the distal end portion 261. The distal end portion 261 has a clearance opening 268 aligned with a complementary recess 270 within a projection of the connector seat 264. The proximal end portion 262 contacts the stem 254 and thus acts on the pilot diaphragm. A main pilot spring 265 is fitted within the spring chamber and extends between an annular adjustable end stop 266 with a central opening 267 and the distal end portion 261 of the spring container. Thus, compression force from the main pilot spring 265 is transferred between the end portions 261 and 262 of the spring container 256 and through the stem 254 to the pilot diaphragm 238.

The third embodiment 230 has an actuator apparatus 273 having a actuator body 275 with a flexible actuator diaphragm 276 extending between complementary portions of the actuator body. The actuator body has first and second actuator ports 279 and 280 which communicate with the first and second differential conduits 103 and 104 respectively, as seen in FIG. 1. The diaphragm 276 divides the actuator body into first and second actuator chambers 281 and 282 which communicate with the first and second actuator ports 279 and 280 respectively as previously described.

The third embodiment 230 further comprises a connector 285 extending between the actuator body 275 and the pilot valve body 232 to connect the bodies together and to adjust spacing therebetween. The connector 285 has a hollow bolt or threaded spacer sleeve 287 having a spacer bore 289 (broken outline), a connector bar 291, and a pair of threaded studs 295 extending from the body 275. The bar 291 is connected to the valve body 232 by nuts 293 threaded on the sleeve 287, and to the studs 295 by nuts 296. The position of the bar 291 can be adjusted axially on the studs 295 to vary spacing of the valve body 232 from the actuator body 275. The spacer sleeve 287 has an inner end cooperating with the annular end stop 266 so that rotation of the sleeve 287 moves the end stop 266 to vary compression of the main pilot spring 265 and thus force on the stem 254. Thus the sleeve 287 and associated structure and nuts 293 serve as an adjustable spring stop of the pilot valve body which is located by the spacer sleeve to permit adjustment of datum force of the main pilot spring.

A hollow connector bolt 301 is fitted within a complementary screw-threaded opening within the actuator body 275 and has an inner end 303 located in the chamber 282 to serve as an actuator diaphragm stop to limit downward movement of the diaphragm 276. Thus, position of the bolt 301 is adjustable to vary position of the stop, and a locking nut 305 locates the bolt and thus the inner end 303. Thus the connector bolt 301 serves as a connector sleeve which cooperates with the actuator body and is adjustable axially relative to the actuator body so that the inner end 303 of the bolt can function equivalently to the inner end 180 of the screw 178 of FIG. 2 to serve as an adjustable actuator diaphragm stop.

The bolt 301 has an axial connector bore 302 which is aligned with the spacer bore 289 and the openings 267 and 268 in the adjustable end stop 266 and the distal end portion 261 respectively. A straight and rigid connecting rod 308 passes through the two aligned bores and two aligned openings so that a proximal end portion 309 thereof passes through the clearance opening 268 in the distal end portion 261 of the spring container and engages the recess 270 of the connector seat 264. The rod 308 has a distal end portion 311 cooperating with the actuator diaphragm 276 to move therewith. Force from the compression coil spring 258 is transferred through the connector seat 264 onto the proximal end portion 309 of the rod, so that the distal end portion 311 thereof is urged against the stem 254 to move the yoke 250 with the pilot diaphragm 238.

It can be seen that the main pilot spring 265 applies an adjustable datum force to the pilot diaphragm 238 in a first axial direction shown as arrow 313. It can also be seen that the compression coil spring 258 serves as a resilient connector or compression member which cooperates with the pilot diaphragm so as to transfer the first resilient force to the pilot diaphragm in the said first axial direction to complement the datum force from the main pilot spring. Thus, it can be seen that the springs 265 and 258 function in a manner similar to the springs 124 and 144 respectively of FIG. 2. Also, it can be seen that the spring 258 serves as a resilient connector interconnecting the actuator diaphragm 276 and the pilot diaphragm 238 to apply a first resilient force between the diaphragms and to permit limited relative movement therebetween to vary force acting on the pilot diaphragm resulting from movement from the actuator diaphragm. This results in displacement of the second pilot valve member to control flow through the pilot valve port as previously described.

The third embodiment 230 can also be improved to incorporate some of the features found in the first embodiment 18, for example, an actuator spring, not shown, can be fitted on a spring seat, also not shown, carried on the inner end 303 of the bolt 301 to apply a force to the actuator diaphragm 276, and thus to function in a manner generally similar to the actuator compression spring 91 of FIG. 2.

Operation of the third embodiment 230 follows closely operation of the first and second embodiments as previously described. It has been found that adjustment of the spring forces and spacing is somewhat more cumbersome than similar adjustments that can be made on the first and second embodiments.

What is claimed is:

1. A pilot valve apparatus comprising:
    (a) a pilot valve body having a pilot inlet port and a pilot outlet port communicating with an interior of the valve body;
    (b) a flexible pilot diaphragm dividing the interior of the pilot valve body into first and second pilot chambers on opposite sides of the pilot diaphragm;
    (c) a first pilot valve member and a second pilot valve member cooperating with each other to control flow through the ports, the first pilot valve member being fixed relative to the pilot valve body and the second valve member being responsive to the position of the pilot diaphragm;
    (d) an actuator apparatus having an actuator body and a moveable actuator partition, the actuator partition dividing an interior of the actuator body into first and second actuator chambers, the actuator body having first and second actuator ports communicating with the first and second actuator chambers respectively; and
    (e) a resilient connector cooperating with the actuator partition and the pilot diaphragm to permit limited relative movement therebetween and to transfer a first resilient force to the pilot diaphragm resulting from movement of the actuator partition so as to vary location of the second pilot valve member and thus control flow through the pilot valve ports.

2. An apparatus as claimed in claim 1 in which:
    (a) the first and second actuator chambers are isolated from atmospheric pressure.

3. An apparatus as claimed in claim 1 in which:
    (a) the resilient connector is a coil spring.

4. An apparatus as claimed in claim 1 in which:
    (a) the actuator body has a connector opening communicating with the first actuator chamber;
    (b) a connecting conduit extends between the connector opening of the first actuator chamber and the pilot outlet port which communicates with the second pilot chamber of the pilot valve; and (c) the resilient connector extends at least partially through the connecting conduit so as to interconnect the pilot diaphragm and actuator partition.

5. An apparatus as claimed in claim 4 in which:
(a) the resilient connector includes a conduit seal which seals the connector opening so as to seal the first actuator chamber from the second pilot chamber while permitting movement of the resilient connector.

6. An apparatus as claimed in claim 5 in which:
(a) the conduit seal comprises a cylindrical member and an annular resilient seal, the annular seal cooperating with the cylindrical member and the connecting conduit to seal thereagainst.

7. An apparatus as claimed in claim 5 further comprising:
(a) a drain port located on a side of the seal portion remote from the actuator to permit drainage of fluid from the pilot outlet port.

8. An apparatus as claimed in claim 4 in which:
(a) the resilient connector provides a clearance through the connecting conduit to permit fluid to flow between the second pilot chamber and the first actuator chamber.

9. An apparatus as claimed in claim 1 further comprising:
(a) an actuator stop cooperating with the actuator partition so as to limit movement of the actuator partition within the actuator body.

10. An apparatus as claimed in claim 9 in which:
(a) the first actuator chamber has a connector opening communicating therewith;
(b) the resilient connector extends through the pilot outlet port and the connector opening to connect to a first side of the actuator partition in the first actuator chamber; and
(c) the actuator stop is located in the second actuator chamber and positioned to contact a second side of the actuator partition so as to limit displacement of the actuator partition.

11. An apparatus as claimed in claim 1 further comprising:
(a) an actuator resilient member which cooperates with the actuator partition to apply a second force to the actuator partition to complement the first resilient force from the resilient connector.

12. An apparatus as claimed in claim 11 further comprising:
(a) a force adjuster cooperating with the actuator resilient member to selectively initiate and vary the second resilient force applied to the actuator partition.

13. An apparatus as claimed in claim 11 further comprising:
(a) an actuator stop comprising an inner screw-threaded member with inner and outer ends, the inner end cooperating with the actuator partition to limit movement thereof, and the outer end being engagable by an operator to permit adjustment to vary position of the stop, and
(b) an adjuster screw has an internally threaded bore to receive the inner screw-threaded member, and an external thread to cooperate with a complementary threaded bore within the actuator body to provide axial movement of the adjuster screw relative to the body, the adjuster screw having inner and outer ends, the inner end serving as a stop to locate one end of the actuator resilient member, and the outer end being engagable by an operator to permit adjustment as a force adjuster to selectively initiate and vary the second resilient force applied to the actuator partition.

14. An apparatus as claimed in claim 1 further comprising:
(a) a spacing adjuster located between the pilot valve body and the actuator body to vary spacing therebetween to permit adjustment of the first resilient force applied by the resilient connector.

15. An apparatus as claimed in claim 14 in which:
(a) the spacing adjuster comprises a threaded adjuster sleeve having oppositely threaded outer ends which engage complementary respective threads associated with the pilot valve body and the actuator body so that rotation of the spacing adjuster varies spacing between the pilot valve body and the actuator body.

16. An apparatus as claimed in claim 14 in which:
(a) the spacing adjuster is an adjuster sleeve having a bore; and
(b) the resilient connector is located within the bore of the sleeve.

17. An apparatus as claimed in claim 1 in which:
(a) the pilot valve body has a spring chamber having an adjustable spring stop;
(b) a main pilot spring extends between the adjustable spring stop and the pilot diaphragm to apply a datum force to the pilot diaphragm in a first axial direction; and
(c) the resilient connector cooperates with the pilot diaphragm so as to transfer the first resilient force to the pilot diaphragm in the said first axial direction to complement the datum force from the main pilot spring.

18. An apparatus as claimed in claim 17 in which:
(a) the first pilot valve member comprises a conduit seat located with respect to the pilot valve body; and
(b) the second pilot valve member comprises a valve yoke cooperating with the pilot diaphragm so as to be responsive to the position of the pilot diaphragm, the yoke having a yoke seal which cooperates with the conduit seat of the first pilot valve member so as to control fluid flow through the first pilot port.

19. An apparatus as claimed in claim 18 in which:
(a) the main pilot spring is located adjacent the first pilot chamber on a first side of the pilot diaphragm;
(b) the valve yoke is located in the second pilot chamber on an opposite second side of the pilot diaphragm;
(c) the resilient connector is a tension member and has one end cooperating with the valve yoke and an opposite end cooperating with the actuator partition; and
(d) the first valve member is a conduit extending inwardly from a side wall of the second pilot chamber to the conduit seat, the conduit seat being received within the yoke to cooperate with the yoke seal so as to control flow through the first pilot port.

20. An apparatus as claimed in claim 17 further comprising:
(a) a spring container is located within the spring chamber of the pilot valve body, the spring container containing the resilient connector and having a distal end portion acting on the pilot diaphragm and a proximal end portion acting on the main pilot spring, the proximal end portion having a clearance opening therein;
(b) a connector seat located within the spring container and cooperating with the resilient connector; and
(c) a rigid connecting rod having a proximal end portion passing through the clearance opening in the proximal end portion of the spring container and engaging the connector seat, and a distal end portion cooperating with the actuator partition to move therewith.

21. An apparatus as claimed in claim 20 further comprising:
   (a) a spacer extending between the actuator body and the pilot valve body to adjust spacing therebetween, the spacer having a spacer sleeve with a spacer bore to receive the connecting rod passing therethrough; and
   (b) a connector sleeve cooperating with the actuator body and having a connector bore aligned with the spacer bore and receiving the connecting rod passing therethrough, the connector sleeve being adjustable axially relative to the actuator body;
and in which:
   (c) the pilot valve body has an opening cooperating with the spacer sleeve to receive the connecting rod into the spring chamber;
   (d) the adjustable spring stop of the pilot valve body is located by the spacer sleeve to permit adjustment of the datum force of the main pilot spring; and
   (e) the resilient connector is a compression member.

22. An automatic fluid control system comprising:
   (a) a main valve apparatus having: a main valve body with an inlet port, an outlet port and a main valve seat disposed between the ports; a main valve member moveable between an open position clear of the valve seat and a closed position engaging the valve seat; a main valve diaphragm cooperating with the main valve member and main valve body to define a control chamber having a control port, the main valve member being responsive to control pressure within the control chamber acting on the main valve diaphragm;
   (b) a pilot valve apparatus having a flexible pilot diaphragm, a pilot inlet port, and a pilot outlet port, the ports communicating with one side of the pilot diaphragm; the pilot valve apparatus also comprising an actuator apparatus having a moveable actuator partition, and first and second actuator ports communicating with opposite sides of the actuator partition;
   (c) a T-junction having a T-inlet port, a T-control port, and a T-pilot port;
   (d) an inlet conduit communicating the inlet port of the main valve with the T-inlet port of the T-junction, a control conduit communicating the control port of the main valve with the T-control port, and a pilot conduit communicating the pilot inlet port of the pilot valve apparatus with the T-pilot port;
   (e) first and second pressure differential conduits communicating with the first and second actuator ports respectively to apply a force to the actuator partition dependent on fluid flow through the main valve; and
   (f) a resilient connector cooperating with the actuator partition and the pilot diaphragm to permit limited relative movement therebetween and to transfer a first resilient force to the pilot diaphragm resulting from movement of the actuator partition so as to vary flow through the pilot valve apparatus.

23. An apparatus as claimed in claim 22 further comprising:
   (a) a main flow sensor cooperating with the main valve so as to receive at least a portion of fluid flow passing through the main valve; and
   (b) first and second pressure differential ports communicating with the main flow sensor and the first and second pressure differential conduits so as to generate a pressure differential therebetween reflecting fluid volume flow through the main valve, the first and second differential conduits being connected to the first and second actuator ports respectively to communicate with the opposite sides of the actuator partition so as to expose the actuator partition to the pressure differential.

24. An apparatus as claimed in claim 22 in which:
   (a) the T-junction is a flow stabilizer and includes a metering orifice communicating with the T-inlet port which serves as a stabilizer inlet port communicating with the inlet conduit, the T-control port serves as a stabilizer control port communicating with the control port of the main valve to generate the control pressure acting on the main valve member, and the T-pilot port serves as a stabilizer pilot port communicating with the pilot inlet port of the pilot valve apparatus, output from the flow stabilizer being metered to reduce hunting.

25. An apparatus as claimed in claim 22 in which:
   (a) the actuator partition divides the actuator into first and second actuator chambers which are isolated from atmospheric pressure.

26. An apparatus as claimed in claim 22 in which:
   (a) the pilot valve has a main pilot spring cooperating with the pilot diaphragm to apply a datum force to the pilot diaphragm in a first axial direction; and
   (b) the resilient connector is a coil spring which applies the resilient force to the pilot diaphragm in said first axial direction to complement the datum force from the main pilot spring.

27. An apparatus as claimed in claim 22 in which:
   (a) the actuator body has a connector opening communicating with the first actuator chamber;
   (b) a connecting conduit extends between the connector opening of the actuator body and the pilot outlet port of the pilot valve; and
   (c) the resilient connector extends at least partially through the connecting conduit so as to interconnect the pilot diaphragm and the actuator partition.

28. An apparatus as claimed in claim 27 in which:
   (a) a drain port communicates with the pilot outlet port;
   (b) the resilient connector includes a conduit seal which seals the connector opening of the actuator body so as to seal the first actuator chamber from the pilot outlet port while permitting movement of the resilient connector, the conduit seal being fitted between the drain port and the first actuator chamber to permit fluid to drain from the pilot outlet port and through the drain port; and
   (c) an outlet conduit extending between the drain port of the pilot valve and the outlet port of the main valve to permit fluid drained from the pilot valve to be returned downstream of the main control valve apparatus and to transmit downstream pressure to the drain port, the pilot outlet port and thus to the pilot diaphragm.

29. An apparatus as claimed in claim 27 in which:
   (a) the resilient connector provides a clearance completely through the connecting conduit to permit fluid to drain from the pilot outlet port and into the first actuator chamber to permit liquid to drain from the pilot valve into the actuator.

30. A pilot valve apparatus comprising:
   (a) a pilot valve body having a pilot inlet port and a pilot outlet port communicating with an interior of the valve body;

(b) a flexible pilot diaphragm dividing the interior of the pilot valve body into first and second pilot chambers on opposite sides of the pilot diaphragm;

(c) a first pilot valve member and a second pilot valve member cooperating with each other to control flow through the ports, the first pilot valve member being fixed relative to the pilot valve body and the second pilot valve member being responsive to the position of the pilot diaphragm;

(d) an actuator apparatus having an actuator body and a moveable actuator partition, the partition dividing an interior of the actuator body into first and second actuator chambers, the actuator body having first and second actuator ports communicating with the first and second actuator chambers respectively; and (e) means to permit limited independent relative movement between the pilot diaphragm and the actuator partition, and to transfer force from the actuator partition to the pilot diaphragm to vary flow through the pilot valve, the means to permit said limited movement cooperating with the pilot diaphragm and the actuator partition.

31. A apparatus as claimed in claim 30 in which:

(a) the means to permit limited independent relative movement between the pilot diaphragm and the actuator partition comprises a resilient connector cooperating with the actuator partition and the pilot diaphragm to permit limited relative movement therebetween.

32. A method of controlling fluid flow through a main valve to maintain downstream pressure substantially between two pre-determined set-points, the method comprising the steps of:

(a) detecting inlet pressure in fluid flow adjacent an inlet of the main valve and generating a control pressure signal proportional to said inlet pressure;

(b) transmitting a first portion of the control pressure signal to act on a main valve member of the main valve to control position of the main valve member based on flow through the main valve;

(c) transmitting a second portion of the control pressure signal to a pilot valve apparatus to control flow therethrough, the pilot valve apparatus having a flexible pilot diaphragm;

(d) generating two pressure differential signals to reflect the fluid flow rate through the main valve;

(e) transmitting the pressure differential signals to opposite sides of a moveable actuator partition of an actuator to deflect the actuator partition in response to said pressure differential signal;

(f) transmitting downstream pressure to the pilot diaphragm; and (g) transmitting a resilient force to the pilot diaphragm arising from at least a portion of said deflection of the actuator partition so as to vary flow through the pilot valve, which in turn modifies the control pressure acting on the main valve member to re-position the main valve member to maintain downstream pressure substantially between the set-points.

33. A method as claimed in claim 32 further characterized by:

(a) generating said first and second pressure differential signals by detecting fluid pressures adjacent complementary portions of a flow sensor positioned in series with the main control valve.

34. A method as claimed in claim 32 further characterized by:

(a) transmitting a datum force to the pilot diaphragm in a first axial direction, the datum force being based on a predetermined downstream pressure; and (b) complementing the datum force on the pilot diaphragm with the resilient force applied by the resilient connector to vary flow through the pilot valve apparatus.

35. A method as claimed in claim 32 further characterized by:

(a) limiting travel of the actuator partition to limit the resilient force transferred by the resilient connector from the actuator partition to the pilot diaphragm so as to control downstream flow characteristics.

36. A method as claimed in claim 32 further characterized by:

(a) applying a second resilient force to the actuator partition, which force increases proportionately to displacement of the actuator partition from an initial position in which the second resilient force applied to the partition is minimum.

37. A method of controlling fluid flow through a main valve to maintain downstream pressure substantially between two pre-determined set-points, the method comprising the steps of:

(a) detecting inlet pressure in fluid flow adjacent an inlet of the main valve and generating a control pressure signal proportional to said inlet pressure;

(b) transmitting a first portion of the control pressure signal to act on a main valve member of the main valve to control position of the main valve member based on flow through the main valve;

(c) transmitting a second portion of the control pressure signal to a pilot valve apparatus to control flow therethrough, the pilot valve apparatus having a flexible pilot diaphragm;

(d) generating two pressure differential signals to reflect the fluid flow rate through the main valve;

(e) transmitting the pressure differential signals to opposite sides of a moveable actuator partition of an actuator to deflect the actuator partition in response to said pressure differential signal;

(f) transmitting downstream pressure to the pilot diaphragm; and (g) permitting limited independent relative movement between the pilot diaphragm and the actuator partition and transferring force from the actuator partition to the pilot diaphragm to vary flow through the pilot valve to reposition the main valve member to maintain downstream pressure substantially between the set-points.

* * * * *